US009550502B2

(12) United States Patent
Kitou

(10) Patent No.: US 9,550,502 B2
(45) Date of Patent: Jan. 24, 2017

(54) COVER STRUCTURE IN SLIDE POSITION DETECTION DEVICE FOR VEHICLE SEAT

(71) Applicants: TOYOTA BOSHOKU KABUSHIKI KAISHA, Aichi-ken (JP); SHIROKI CORPORATION, Kanagawa (JP)

(72) Inventor: Hidekazu Kitou, Seto (JP)

(73) Assignees: TOYOTA BOSHOKU KABUSHIKI KAISHA, Aichi-ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/821,265

(22) Filed: Aug. 7, 2015

(65) Prior Publication Data

US 2016/0061860 A1    Mar. 3, 2016

(30) Foreign Application Priority Data

Aug. 28, 2014   (JP) ................................. 2014-174366

(51) Int. Cl.
| | | |
|---|---|---|
| G01D 11/24 | (2006.01) | |
| B61D 33/00 | (2006.01) | |
| B60N 2/07 | (2006.01) | |
| B60N 2/02 | (2006.01) | |

(52) U.S. Cl.
CPC ............ B61D 33/0078 (2013.01); B60N 2/07 (2013.01); B60N 2/0705 (2013.01); B60N 2/0725 (2013.01); B60N 2002/0272 (2013.01)

(58) Field of Classification Search
CPC .................................................. G01D 5/145
USPC ........................................ 73/431; 324/207.24
See application file for complete search history.

(56) References Cited

U.S. PATENT DOCUMENTS

| | | | | |
|---|---|---|---|---|
| 6,275,026 | B1 * | 8/2001 | Becker | .............. B60R 21/01554 |
| | | | | 280/735 |
| 9,067,513 | B2 * | 6/2015 | Ozawa | .................... B60N 2/067 |
| 2004/0004474 | A1 * | 1/2004 | Kojima | ................ B60N 2/0224 |
| | | | | 324/207.24 |
| 2010/0026283 | A1 * | 2/2010 | Nishide | .................... B60N 2/06 |
| | | | | 324/207.26 |
| 2012/0073369 | A1 * | 3/2012 | Suzuki | ................. G01D 11/245 |
| | | | | 73/431 |

(Continued)

FOREIGN PATENT DOCUMENTS

JP    2014-015202    1/2014

*Primary Examiner* — Lisa Caputo
*Assistant Examiner* — Jamel Williams
(74) *Attorney, Agent, or Firm* — Greenblum & Bernstein, P.L.C.

(57) ABSTRACT

A cover structure in a slide position detection device for a vehicle seat includes a magnetic detector disposed on a side of one of a fixed rail and a movable rail; a cover that covers the magnetic detector and that is disposed on the side of the one rail; and a detected portion disposed on a side of the other rail. The cover includes a lateral cover portion that covers a lateral portion of the magnetic detector, and a detection portion cover portion that faces and covers a detection portion of the magnetic detector; and the detection portion cover portion is provided with a ferromagnetic plate that faces the detection portion, the ferromagnetic plate being located at a position that is farther from the detection portion than a closest position of the detected portion relative to the detection portion, and the ferromagnetic plate shielding against magnetism from the magnetic detector.

7 Claims, 6 Drawing Sheets

(56) References Cited

U.S. PATENT DOCUMENTS

2015/0022189 A1\* 1/2015 Yasuda ................. G01B 7/003
  324/207.13
2015/0167829 A1\* 6/2015 Kim ....................... F16H 59/08
  74/473.12

\* cited by examiner

COVER STRUCTURE IN SLIDE POSITION DETECTION DEVICE FOR VEHICLE SEAT

INCORPORATION BY REFERENCE

The disclosure of Japanese Patent Application No. 2014-174366 filed on Aug. 28, 2014 including the specification, drawings and abstract is incorporated herein by reference in its entirety.

BACKGROUND OF THE INVENTION

1. Field of the Invention

The invention relates to a cover structure in a slide position detection device for a vehicle seat that is mounted in a vehicle such as an automobile, an aircraft, a boat, a vessel, or a train.

2. Description of Related Art

A slide position detection device for a vehicle seat is disclosed in, for example, Japanese Patent Application Publication No. 2014-15202 (JP 2014-15202 A). This detection device includes a magnetic detector that is attached to a movable rail, and a detected portion that is attached to a fixed rail so as to face the magnetic detector. When the movable rail slides on the fixed rail, a slide position is detected by detecting whether or not the detected portion is located at the position facing the magnetic detector.

In the art described in Japanese Patent Application Publication No. 2014-15202 (JP 2014-15202 A), the fixed rail is fixed to a floor via a bracket, and therefore, there is a large clearance between the floor and the magnetic detector that is attached to the movable rail. Accordingly, even in the case where there are magnetic foreign substances, such as iron pieces, on the floor, there is a low possibility of a decrease in detection performance due to the adhesion of the foreign substances to the magnetic detector. However, in the case where the fixed rail is directly fixed to the floor, there is a small clearance between the floor and the magnetic detector. This increases the possibility that the detection performance may decrease due to the adhesion of magnetic foreign substances such as iron pieces on the floor to the magnetic detector. Furthermore, when magnetic foreign substances, such as iron pieces, are located in the vicinity of the magnetic detector for some reason, the magnetic detector may attract them and may cause them to adhere thereto, which may result in a decrease in the detection performance, in the art described in Japanese Patent Application Publication No. 2014-15202 (JP 2014-15202 A).

SUMMARY OF THE INVENTION

The invention provides a cover structure in a slide position detection device for a vehicle seat that can appropriately prevent adhesion of magnetic foreign substances to a magnetic detector.

A first aspect of the invention relates to a cover structure in a slide position detection device for a vehicle seat. The cover structure includes a magnetic detector that is disposed on a side of one of a fixed rail and a movable rail that constitute a slide mechanism for the vehicle seat; a cover that covers the magnetic detector and that is disposed on the side of the one of the fixed rail and the movable rail; and a detected portion that is disposed on a side of the other of the fixed rail and the movable rail. The cover includes a lateral cover portion that covers a lateral portion of the magnetic detector, and a detection portion cover portion that faces a detection portion of the magnetic detector and that covers the detection portion. The detection portion cover portion is provided with a ferromagnetic plate that faces the detection portion, the ferromagnetic plate being located at a position that is farther from the detection portion than a closest position of the detected portion relative to the detection portion, and the ferromagnetic plate shielding against magnetism from the magnetic detector.

According to the aforementioned aspect of the invention, the magnetic detector is covered with the cover. The detection portion cover portion faces the detection portion and covers the detection portion. The detection portion cover portion is provided with the ferromagnetic plate that faces the detection portion, the ferromagnetic plate being located at the position that is farther from the detection portion than the closest position of the detected portion relative to the detection portion. Thus, the ferromagnetic plate shields against the magnetism from the magnetic detector, and the magnetism hardly influences an area on the side of the ferromagnetic plate, the side being opposite to the magnetic detector side. Thus, even in the case where there are magnetic foreign substances, such as iron pieces, in the vicinity of the magnetic detector, for example, in the case where there is a small clearance between the floor and the magnetic detector, it is possible to reduce the possibility that detection performance may decrease due to the attraction and adhesion of magnetic foreign substances, such as iron pieces, to the magnetic detector.

In the aforementioned aspect, the lateral cover portion and the detection portion cover portion may be integrally formed.

According to the aforementioned configuration, the cover is integrally formed. Therefore, the ferromagnetic plate can be easily attached to the detection portion cover portion by simply placing the ferromagnetic plate on the surface of the detection portion cover portion, and fixing the ferromagnetic plate.

In the aforementioned aspect, the one of the fixed rail and the movable rail may be the movable rail; the other of the fixed rail and the movable rail may be the fixed rail, and may be attached to a floor; the cover may be formed of resin; and the ferromagnetic plate may be provided on a side of a face of the detection portion cover portion, the face facing toward the magnetic detector.

According to the aforementioned configuration, the cover is formed of resin, and the ferromagnetic plate is provided on the side of the face of the detection portion cover portion, the side facing toward the magnetic detector. Therefore, the ferromagnetic plate is easily attached to the cover, for example, by engaging the ferromagnetic plate with an engagement portion that is molded integrally with the cover. Furthermore, the ferromagnetic plate is covered with the cover from the floor side. Therefore, even when the ferromagnetic plate is made unfixed from the cover (i.e., even when the ferromagnetic plate is released from the cover) for some reason, it is possible to prevent the ferromagnetic plate from falling onto the floor.

In the aforementioned aspect, a standing wall portion that extends toward the magnetic detector may be provided at an end portion of the ferromagnetic plate, the end portion being on a side of the slide mechanism.

According to the aforementioned configuration, the standing wall portion is provided at the end portion of the ferromagnetic plate, the end portion being on the side of the slide mechanism. Therefore, the gap from the magnetic detector can be reduced. If magnetic foreign substances, such as iron pieces, enter this gap, it is possible to cause these foreign substances to adhere to the end portion of the standing wall portion. Thus, it is possible to further reduce the possibility that the detection performance may decrease due to the adhesion of magnetic foreign substances, such as iron pieces, to the magnetic detector.

A second aspect of the invention relates to a cover structure in a slide position detection device for a vehicle seat. The cover structure includes a magnetic detector that is disposed on a side of one of a fixed rail and a movable rail that constitute a slide mechanism for the vehicle seat; a cover that covers the magnetic detector and that is disposed on a side of the one of the fixed rail and the movable rail; and a detected portion that is disposed on a side of the other of the fixed rail and the movable rail. The cover includes a lateral cover portion that covers a lateral portion of the magnetic detector, and a ferromagnetic plate that is attached to the lateral cover portion, and that faces toward a detection portion of the magnetic detector, the ferromagnetic plate being located at a position that is farther from the detection portion than a closest position of the detected portion relative to the detection portion, and the ferromagnetic plate shielding against magnetism from the magnetic detector.

According to the aforementioned configuration, the lateral portion of the magnetic detector is covered with the lateral cover portion. The ferromagnetic plate faces the detection portion, and is provided at the position that is farther from the detection portion than the closest position of the detected portion relative to the detection portion. Thus, the ferromagnetic plate shields against the magnetism from the magnetic detector, and the magnetism hardly influences the area on the side of the ferromagnetic plate, the side being opposite to the magnetic detector side. Thus, even in the case where there are magnetic foreign substances, such as iron pieces, in the vicinity of the magnetic detector, for example, in the case where there is a small clearance between the floor and the magnetic detector, it is possible to reduce the possibility that the detection performance may decrease due to the attraction and adhesion of magnetic foreign substances, such as iron pieces, to the magnetic detector. Further, since the ferromagnetic plate is directly attached to the lateral cover portion, the cover structure can be simplified and reduced in weight.

BRIEF DESCRIPTION OF THE DRAWINGS

Features, advantages, and technical and industrial significance of one exemplary embodiment of the invention will be described below with reference to the accompanying drawings, in which like numerals denote like elements, and wherein.

DETAILED DESCRIPTION OF EMBODIMENT

FIGS. 1 to 5 show one embodiment of the invention. This embodiment represents an example in which the invention is applied to a vehicle seat. In each of the drawings, directions with respect to a vehicle at the time when the vehicle seat is attached to the vehicle are indicated by arrows. In the following description, the description of directions will be provided with reference to these directions. Paired slide rail mechanisms of the vehicle seat are provided to adjust the position of the vehicle seat in a front-rear direction with respect to a floor, and are arranged below right and left lateral portions of the vehicle seat respectively. One of the slide rail mechanisms will be described hereinafter, and the description of the other slide rail mechanism will be omitted, although only the differences therebetween will be described.

Figure 1:
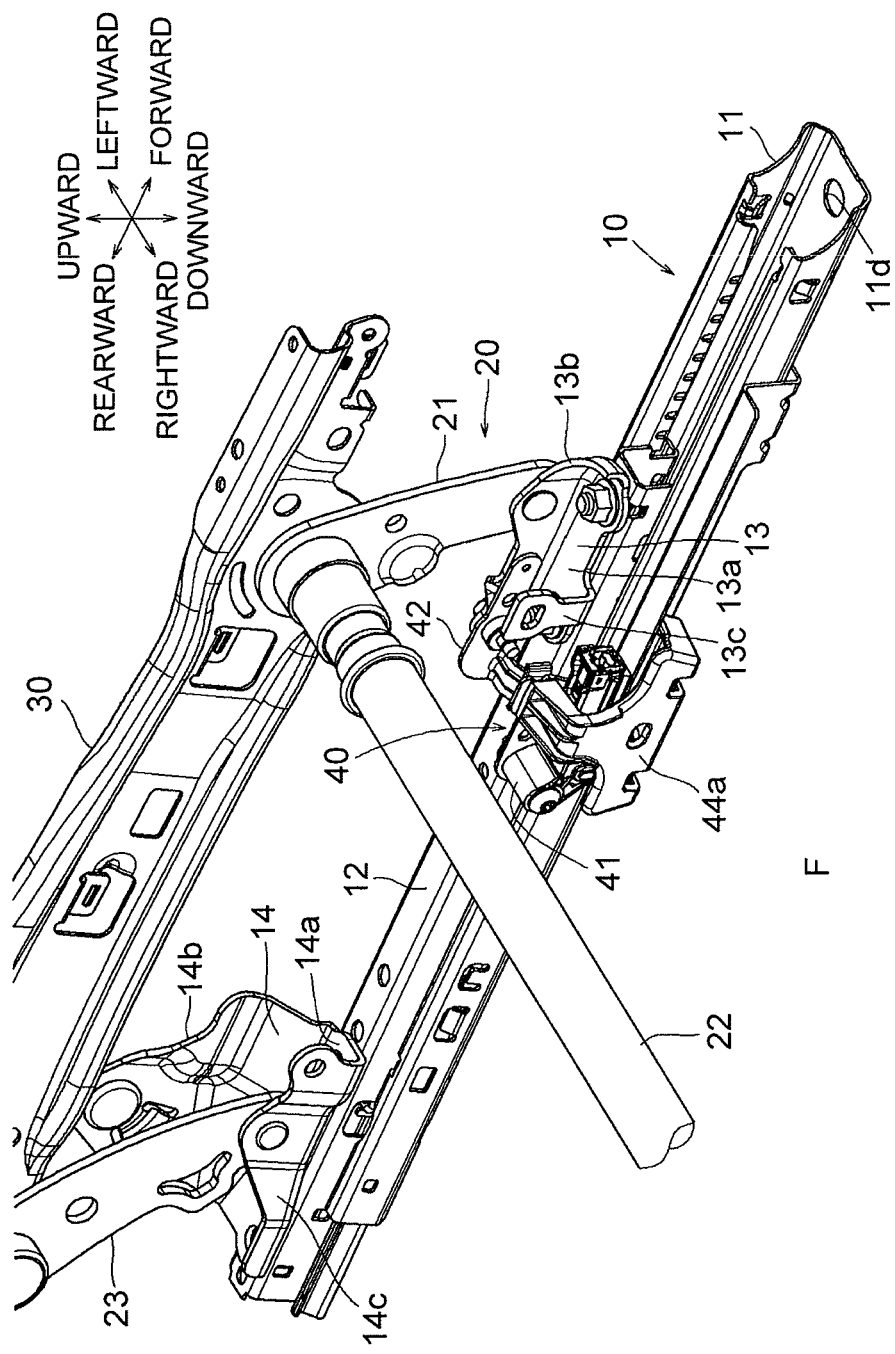
FIG. 1 is a perspective view showing a state where a cover structure in a slide position detection device according to an embodiment of the invention is applied to a vehicle seat.
Figure 2:
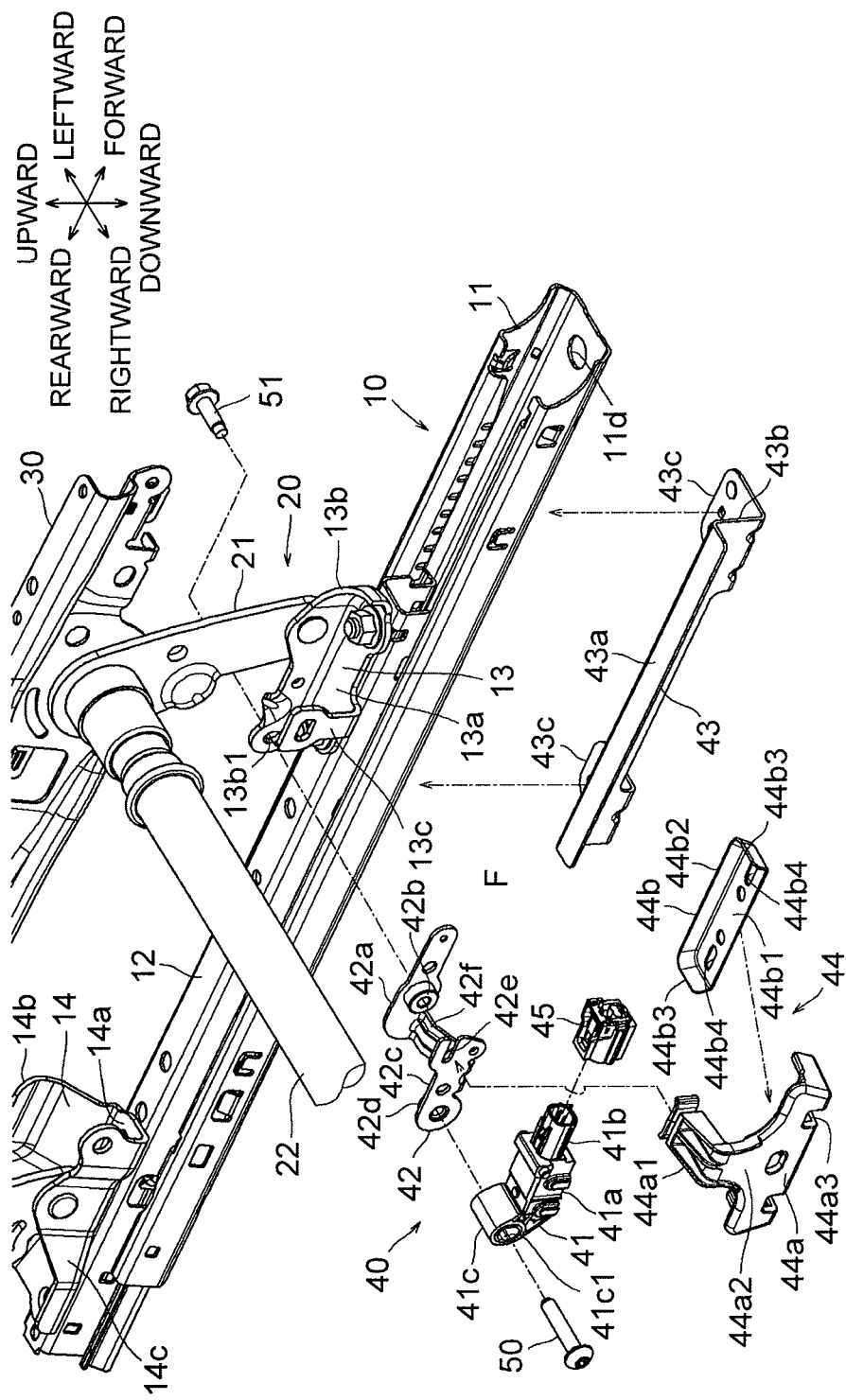
FIG. 2 is an exploded perspective view of FIG. 1.
Figure 4:
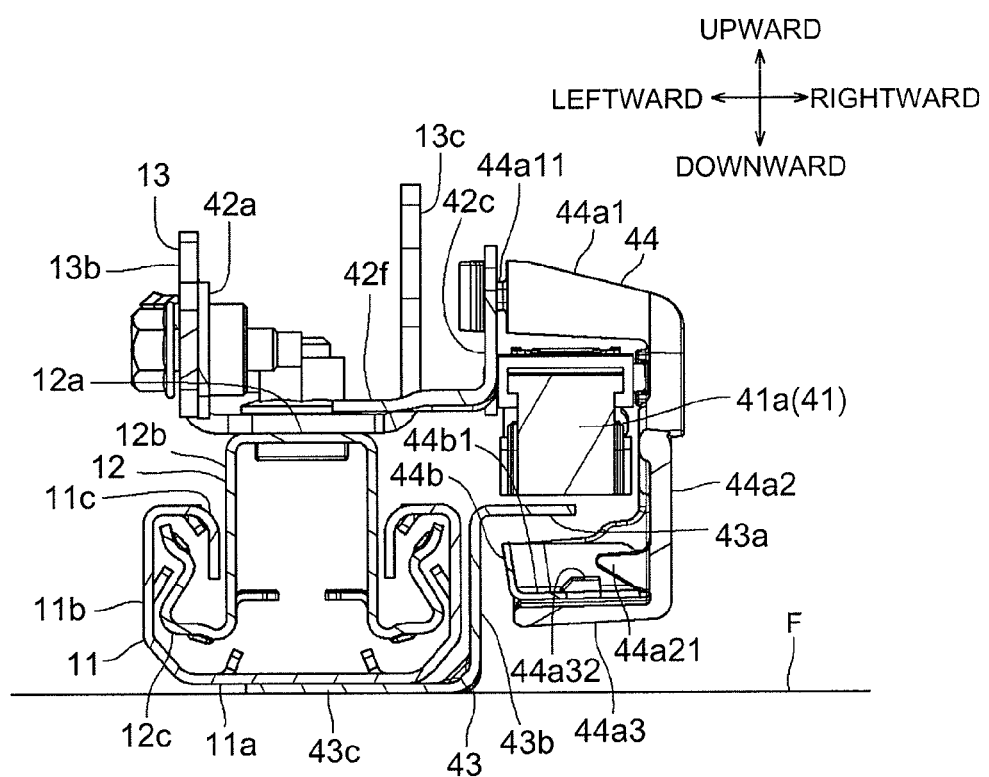
FIG. 4 is a cross-sectional view taken along an arrow line IV-IV of FIG. 3.

As shown in FIGS. 1 and 2, a slide rail mechanism 10 includes a lower rail 11 that extends in the front-rear direction and that is fixed to a floor F, and an upper rail 12 that extends in the front-rear direction and that is fitted to the lower rail 11 so as to be slidable in the front-rear direction with respect to the lower rail 11. This lower rail 11 corresponds to "the fixed rail" of the invention, and this upper rail 12 corresponds to "the movable rail" of the invention. As shown in FIG. 4, the lower rail 11 is a member with a constant cross-section, and the lower rail 11 includes a bottom face portion 11a, both standing wall portions 11b, and both downward bent portions 11c. The lower rail 11 is fixed through fastening to the floor F by passing bolts through a bolt hole 11d that is provided in a front end portion of the bottom face portion 11a, and a bolt hole (not shown) that is similarly provided in a rear end portion of the bottom face portion 11a. Accordingly, the bottom face portion 11a of the lower rail 11 is located close to the floor F. As shown in FIG. 4, the upper rail 12 is a member with a constant cross-section, and the upper rail 12 includes an upper face portion 12a, both standing wall portions 12b, and both upward bent portions 12c. The upper rail 12 is fitted to the lower rail 11 such that the standing wall portions 12b and the upward bent portions 12c are fitted to the standing wall portions 11b and the downward bent portions 11c. Rolling members (not shown) such as balls, rollers or the like are inserted between the upper rail 12 and the lower rail 11, thus reducing the sliding resistance therebetween.

A front bracket 13 is attached to a front end portion of the upper face portion 12a of the upper rail 12, and a rear bracket 14 is attached to a rear end portion of the upper face portion 12a of the upper rail 12. As shown in FIG. 2, the front bracket 13 is a plate member including a bottom face portion 13a that extends in the front-rear direction, a standing wall portion 13b that is erected upward in a region from a front end portion of the bottom face portion 13a to a left lateral end portion of the bottom face portion 13a, and a harness attachment portion 13c that is erected at a right lateral end portion of the bottom face portion 13a. A lower end portion of a front link 21, which is a plate member that constitutes a lifter mechanism 20, is supported at a front portion of a left lateral portion of the standing wall portion 13b such that the front link 21 is rotatable in an up-down direction. A bolt hole 13b1 for attachment of an attachment bracket 42 is provided in the vicinity of a rear end portion of the left lateral portion of the standing wall portion 13b. An upper end portion of the front link 21 and an upper end portion of a front link that is attached to the other slide rail mechanism (which is provided on the right side of the slide rail mechanism 10) are coupled to each other by a front pipe 22, and the two front links are configured to integrally rotate with respect to the front bracket 13. As shown in FIG. 1, the rear bracket 14 is a plate member including a bottom face portion 14a that extends in the front-rear direction, a curved standing wall portion 14*b* that is erected upward from a left lateral end portion of the bottom face portion 14*a* in a curved manner, and a standing wall portion 14*c* that is erected at a right lateral end portion of the bottom face portion 14*a*. A lower end portion of a rear link 23, which is a plate member that constitutes the lifter mechanism 20, is supported in the vicinity of a central portion of the standing wall portion 14*c* in the front-rear direction such that the rear link 23 is rotatable in the up-down direction. An upper end portion of the rear link 23 and an upper end portion of a rear link that is attached to the other slide rail mechanism (which is provided on the right side of the slide rail mechanism 10) are coupled to each other by a rear pipe (not shown), and the two rear links are configured to integrally rotate with respect to the rear bracket 14.

The front pipe 22 is rotatably attached to a position in the vicinity of a front end portion of a side frame 30 that constitutes a cushion frame. The rear pipe is rotatably attached to a rear end portion of the side frame 30. The side frame 30 is a sheet metal member, and substantially has a shape in which flanges extending toward a seat outer side are provided at upper and lower end portions of a plate material extending in the front-rear direction. The side frame 30 and the other side frame are coupled to each other by the front pipe 22 and the rear pipe, and are coupled at front end portions thereof to each other by a front panel (not shown), thus constituting the cushion frame. By rotating the front link 21 or the rear link 23 with respect to the cushion frame using a link operation mechanism (not shown), the cushion frame can be moved in the up-down direction with respect to the slide rail mechanisms.

As shown in FIG. 2, a slide position detection device 40 mainly includes a magnetic detector 41, the attachment bracket 42, a detected body 43, and a cover 44, and is attached only to the slide rail mechanism 10. That is, the slide position detection device 40 is not provided on the other slide rail mechanism. One slide position detection device 40 is provided for each vehicle seat. The magnetic detector 41 is integrally formed of resin, and includes a magnetic force detection portion 41*a*, a connector attachment portion 41*b* for attachment of a wiring connector 45, and a detector attachment portion 41*c* for attaching the magnetic detector 41 to the attachment bracket 42. This magnetic force detection portion 41*a* corresponds to "the detection portion" of the invention. The attachment bracket 42 is a member that substantially has a shape in which lower end portions of two plate materials that are opposed to and spaced apart from each other are linked with each other to be integrated with each other. The attachment bracket 42 includes a front bracket attachment portion 42*a*, a magnetic detector attachment portion 42*c*, and a coupling portion 42*f* that couples the front bracket attachment portion 42*a* and the magnetic detector attachment portion 42*c* to each other. A protruding portion 42*b*, in which an internal thread is engraved, is provided on a face of the front bracket attachment portion 42*a* that is opposite to a face thereof that is attached to the front bracket 13, at a position in the vicinity of a central portion thereof in the front-rear direction. A protruding portion 42*d*, in which an internal thread is engraved, is provided on a face of the magnetic detector attachment portion 42*c* that is opposite to a face thereof to which the magnetic detector 41 is attached, at a position in the vicinity of a rear end portion thereof Furthermore, a slit 42*e* that extends in the front-rear direction is provided at an upper portion of a front end portion of the magnetic detector attachment portion 42*c* such that the cover 44 is engaged with the slit 42*e*. The front bracket attachment portion 42*a* and the magnetic detector attachment portion 42*c* are linked with each other by the coupling portion 42*f*, which is provided with a rib.

As shown in FIG. 2, the detected body 43 is an iron member with a substantially L-shaped cross-section. The detected body 43 includes a long rectangular detection face portion 43*a* that extends in the front-rear direction, a standing wall portion 43*b* that is provided so as to extend downward from one end portion of the detection face portion 43*a* in a right-left direction, and two lower rail attachment portions 43*c* that are provided so as to extend from front and rear end portions of a lower end of the standing wall portion 43*b* respectively in parallel with the detection face portion 43*a* and in a direction opposite to a direction in which the detection face portion 43*a* extends. The detection face portion 43*a* is a part that faces the magnetic detector 41 and is detected by the magnetic detector 41. As shown in FIG. 4, the standing wall portion 43*b* is set such that the detection face portion 43*a* is at the same height as an upper end of the standing wall portion 11*b* of the lower rail 11 when the detected body 43 is attached to the lower rail 11. The detected body 43 is attached to a position in the vicinity of a front end portion of the lower rail 11. The attachment is carried out by holding an upper face of the lower rail attachment portion 43*c* in contact with a lower face of the bottom face portion 11*a* of the lower rail 11, and screwing the lower rail attachment portion 43*c* to the bottom face portion 11*a* of the lower rail 11 with the standing wall portion 43*b* located in proximity to an outer face of the standing wall portion 11*b* of the lower rail 11. The detected body 43 may be fixed to a position in the vicinity of the front end portion of the lower rail 11 through welding instead of screwing. It should be noted herein that this detection face portion 43*a* corresponds to "the detected portion" of the invention.

Figure 3:
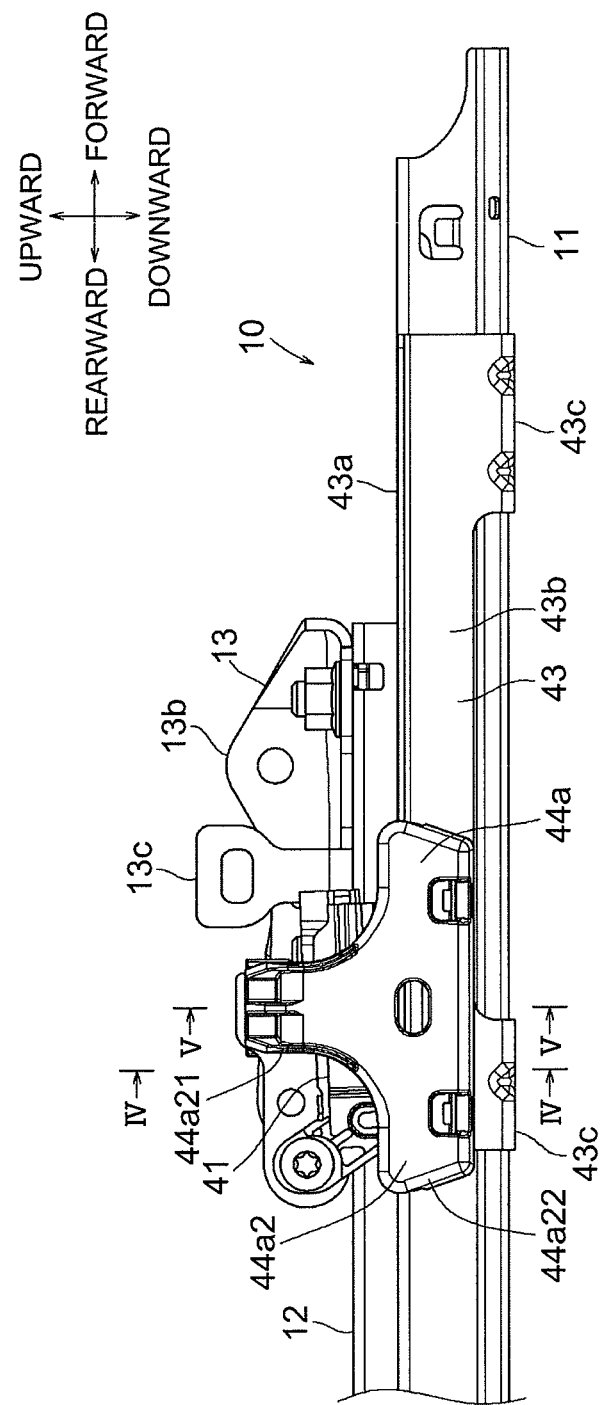
FIG. 3 is a lateral view showing a state where the slide position detection device is attached to a slide mechanism in the aforementioned embodiment of the invention.
Figure 5:
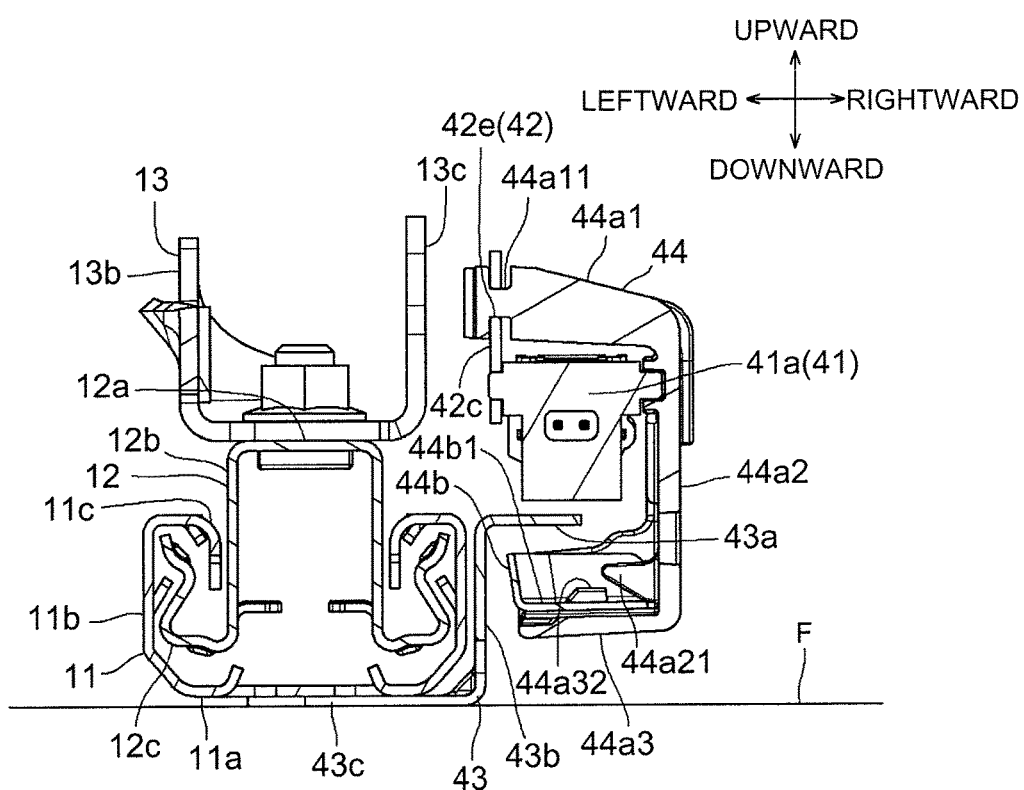
FIG. 5 is a cross-sectional view taken along an arrow line V-V of FIG. 3.
Figure 6:
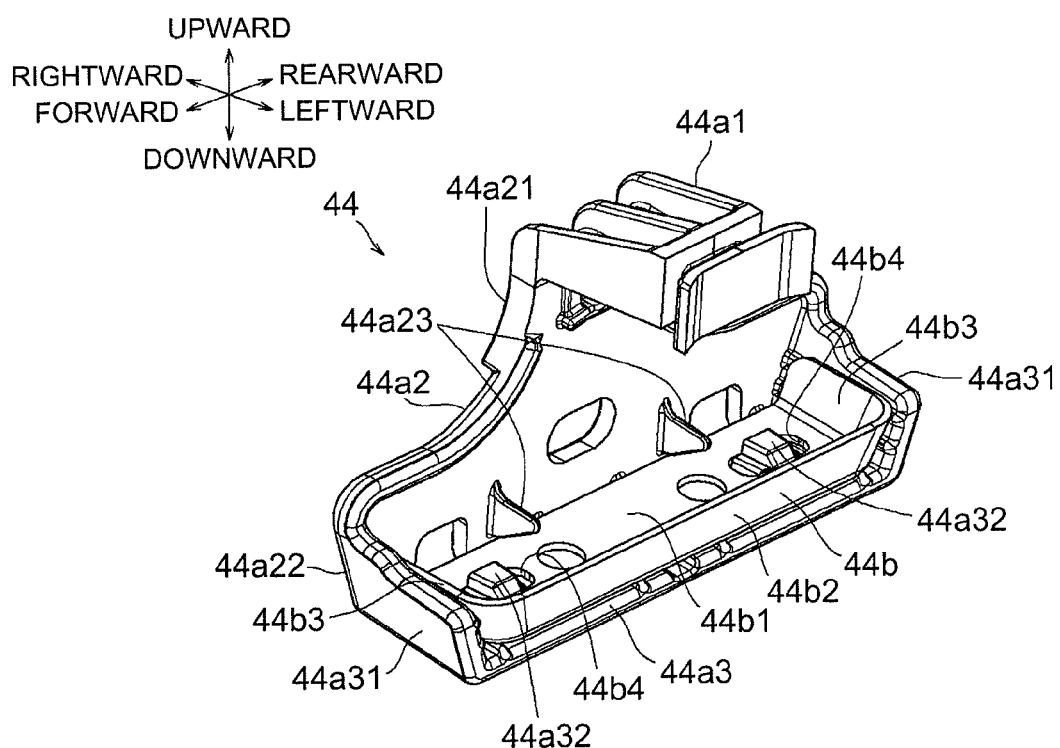
FIG. 6 is a perspective view of a cover as viewed from an inside thereof in the aforementioned embodiment of the invention.

The cover 44 includes a cover body 44*a* made of resin, and a shield plate 44*b* made of iron. The shield plate 44*b* may be made of any ferromagnetic material. Nickel or the like may be used for the shield plate 44*b*. As shown in FIGS. 2 and 6, the cover body 44*a* includes an attachment portion 44*a*1 that is attached to the magnetic detector attachment portion 42*c* of the attachment bracket 42 and that extends in the right-left direction, a lateral cover portion 44*a*2 that extends downward from an end portion of the attachment portion 44*a*1 and that covers a lateral portion of the magnetic detector 41, and a detection portion cover portion 44*a*3 that extends from a lower end portion of the lateral cover portion 44*a*2 while facing the attachment portion 44*a*1. As shown in FIG. 5, a narrowed portion 44*a*11, which is inserted into the slit 42*e* of the attachment bracket 42 from a front side and is fixed to the attachment bracket 42, is provided at an end portion of the attachment portion 44*a*1 that is opposite to an end portion thereof to which the lateral cover portion 44*a*2 is attached. As shown in FIG. 6, the attachment portion 44*a*1 is structured such that three ribs extending in the right-left direction are connected to a thin plate extending in the front-rear direction, but the structure of the attachment portion 44*a*1 is not limited thereto. The attachment portion 44*a*1 may be in the form of a thick plate with no ribs. As shown in FIGS. 3 and 6, the width of the lateral cover portion 44*a*2 in the front-rear direction gradually increases in a downward direction from a narrow width region 44*a*21 at an upper end thereof. In addition, a wide width region 44*a*22 with a substantially constant width is provided from a substantially central portion in the up-down direction to a lower end in the lateral cover portion 44*a*2. Two protrusion portions 44*a*23 are provided in an inner portion of the wide width region 44*a*22. One end of the shield plate 44*b* is engaged with, and fixed to the protrusion portions 44*a*23. Standing wall portions 44*a*31 that are continuous with the wide width region 44*a*22 are provided at end portions of the detection portion cover portion 44*a*3 in the front-rear direction. Two hook portions 44*a*32 are provided on an upper face of the detection portion cover portion 44*a*3. Peripheral edge portions of long holes 44*b*4 provided in the shield plate 44*b* are hooked on, and fixed to the hook portions 44*a*32. It should be noted herein that the shield plate 44*b* corresponds to "the ferromagnetic plate" of the invention.

As shown in FIGS. 2 and 6, the shield plate 44*b* is a pressed part made from an iron sheet, and has a plate thickness of approximately 1 mm. The shield plate 44*b* includes a substantially rectangular bottom face portion 44*b*1, a lateral standing wall portion 44*b*2 that stands at one lateral end portion (a left end portion) of the bottom face portion 44*b*1 in a right-left direction thereof, and front and rear standing wall portions 44*b*3 that stand at front and rear end portions of the bottom face portion 44*b*1 respectively. The long holes 44*b*4 for attachment to the detection portion cover portion 44*a*3 of the cover body 44*a* are provided in the vicinity of the front and rear end portions of the bottom face portion 44*b*1 respectively. The lateral standing wall portion 44*b*2 and the front and rear standing wall portions 44*b*3 are formed to be slightly inclined toward a plate outer side with respect to a direction perpendicular to the bottom face portion 44*b*1. The shield plate 44*b* is placed on and fixed to an upper face of the detection portion cover portion 44*a*3 of the cover body 44*a*. An end portion of the bottom face portion 44*b*1 is inserted along an upper face of the detection portion cover portion 44*a*3 from a lateral portion of the shield plate 44*b* on which the lateral standing wall portion 44*b*2 is not provided, and into a gap between the detection portion cover portion 44*a*3 and the protrusion portions 44*a*23, and the peripheral edge portions of the long holes 44*b*4 are fixed by being hooked on the hook portions 44*a*32. Alternatively, the shield plate 44*b* may be fixed to the cover body 44*a* through integral molding when the cover body 44*a* is molded. Also, the shield plate 44*b* may be fixed to the cover body 44*a* by a method such as adhesion, screwing or the like.

It should be noted herein that the lateral standing wall portion 44*b*2 corresponds to "the standing wall portion" of the invention. In the embodiment, the shield plate 44*b* is placed on the upper face of the detection portion cover portion 44*a*3. However, the invention is not limited to this configuration. For example, the shield plate 44*b* may be fixed above the upper face of the detection portion cover portion 44*a*3 (i.e., the shield plate 44*b* may be provided on the side of the upper face of the detection portion cover portion 44*a*3) such that the shield plate 44*b* is not in contact with the upper face of the detection portion cover portion 44*a*3.

A procedure of attaching the attachment bracket 42, the magnetic detector 41, and the cover 44 to the front bracket 13 of the upper rail 12 will be described. As shown in FIG. 2, a bolt 50, which is passed through a bolt hole 41*c*1 provided in the detector attachment portion 41*c* of the magnetic detector 41 from a side opposite to the protruding portion 42*d*, is fastened to the protruding portion 42*d* provided on the magnetic detector attachment portion 42*c* of the attachment bracket 42. Thus, the magnetic detector 41 is attached to the attachment bracket 42. Subsequently, as shown in FIG. 5, the narrowed portion 44*a*11 of the cover body 44*a* to which the shield plate 44*b* is attached is inserted from the front side into the slit 42*e* of the magnetic detector attachment portion 42*c*. Thus, the cover 44 is attached to the attachment bracket 42. Subsequently, a bolt 51, which is passed through the bolt hole 13*b*1 provided in the standing wall portion 13*b* of the front bracket 13 from the side opposite to the protruding portion 42*b*, is fastened to the protruding portion 42*b* provided on the front bracket attachment portion 42*a* of the attachment bracket 42. Thus, the magnetic detector 41 and the cover 44 are attached to the front bracket 13 via the attachment bracket 42. After that, the wiring connector 45 is attached to the connector attachment portion 41*b* of the magnetic detector 41.

The operation and effect of the present embodiment of the invention will be described, in a situation where the upper rail 12 is slid with respect to the lower rail 11 to which the detected body 43 is attached, with the magnetic detector 41 and the cover 44 attached to the upper rail 12 via the attachment bracket 42. As shown in FIG. 4, in the vicinity of a front end portion of the lower rail 11 to which the detected body 43 is attached, a lower face of the magnetic force detection portion 41*a* of the magnetic detector 41 (a face with a strong magnetic field) is close to an upper face of the detection face portion 43*a* of the detected body 43, and faces the upper face of the detection face portion 43*a* of the detected body 43. Thus, the magnetic detector 41 can detect the detection face portion 43*a* of the detected body 43. This state represents a closest position of the magnetic force detection portion 41*a* relative to the detection face portion 43*a* (in other words, a closest position of the detection face portion 43*a* relative to the magnetic force detection portion 41*a*, i.e., a position of the detection face portion 43*a* at a time when the detection face portion 43*a* is located closest to the magnetic force detection portion 41*a*). At this time, it is possible to detect that the position in the upper rail 12, at which the magnetic detector 41 is attached, is in the vicinity of the front end portion of the lower rail 11 to which the detected body 43 is attached. The utilization of this detection signal makes it possible to perform the control of reducing the size of deployment of an airbag that is mounted in the vehicle, in the case where the upper rail 12 is located at a front side with respect to the lower rail 11, namely, when a small-sized occupant is seated. At this time, the detection portion cover portion 44*a*3 of the cover 44 is located below the detection face portion 43*a* of the detected body 43 and faces toward the lower face of the magnetic force detection portion 41*a*, in a situation where the shield plate 44*b* is placed on the detection portion cover portion 44*a*3. Thus, even if some part of the magnetism from the magnetic force detection portion 41*a* does not hit the detection face portion 43*a*, the shield plate 44*b* shields against the part of the magnetism, and thus, the magnetism does not flow out to an area below the detection portion cover portion 44*a*3. Consequently, even when there are magnetic foreign substances, such as iron pieces, on the floor F, it is possible to reduce the possibility that detection performance may decrease due to the attraction and adhesion of magnetic foreign substances, such as iron pieces, to the magnetic force detection portion 41*a*.

In the case where the position of the magnetic detector 41 attached to the upper rail 12 is located at an intermediate-to-rear portion of the lower rail 11 to which the detected body 43 is not attached, there occurs a situation equivalent to a situation where the detected body 43 has been removed from FIG. 4. At this time, the detection portion cover portion 44*a*3 of the cover 44 is located below the detection face portion 43*a* of the detected body 43 (in other words, the detection portion cover portion 44*a*3 is located at a position that is farther from the magnetic force detection portion 41*a* than the closest position of the detection face portion 43*a* relative to the magnetic force detection portion 41*a*, i.e., the closest position of the detection face portion 43*a* relative to the magnetic force detection portion 41*a* is between the magnetic force detection portion 41*a* and the shield plate 44*b*), and the detection portion cover portion 44*a*3 faces toward the lower face of the magnetic force detection portion 41*a*, in a situation where the shield plate 44*b* is placed on the detection portion cover portion 44*a*3. Thus, the shield plate 44*b* shields against the magnetism from the magnetic force detection portion 41*a*, and accordingly, the magnetism does not flow out to the area below the detection portion cover portion 44*a*3. Consequently, even in the case where there are magnetic foreign substances, such as iron pieces, on the floor F, it is possible to reduce the possibility that the detection performance may decrease due to the attraction and adhesion of magnetic foreign substances, such as iron pieces, to the magnetic force detection portion 41*a*. Furthermore, the lateral standing wall portion 44*b*2 and the front and rear standing wall portions 44*b*3 are provided at the slide rail mechanism 10-side end portion (the end portion on the side of the slide rail mechanism 10) and the front and rear end-side end portions of the shield plate 44*b* respectively. Thus, the gap from the magnetic force detection portion 41*a* can be reduced. Even if magnetic foreign substances, such as iron pieces, enter this gap, they can be caused to adhere to the end portion of the lateral standing wall portion 44*b*2 or the end portions of the front and rear standing wall portions 44*b*3. Consequently, it is possible to further reduce the possibility that the detection performance may decrease due to the adhesion of magnetic foreign substances, such as iron pieces, to the magnetic force detection portion 41*a*. Furthermore, the cover body 44*a* is produced using resin (the cover body 44*a* is formed of resin), and the shield plate 44*b* is provided on the side of the face of the detection portion cover portion 44*a*3, the face facing toward the magnetic force detection portion 41*a*. Thus, the shield plate 44*b* is easily attached to the cover body 44*a*, for example, by engaging the shield plate 44*b* with the hook portions 44*a*32 and the protrusion portions 44*a*23 molded integrally with the cover body 44*a*. Furthermore, the shield plate 44*b* is covered with the detection portion cover portion 44*a*3 from the floor F side. Therefore, even when the shield plate 44*b* is made unfixed from the cover body 44*a* (i.e., even when the shield plate 44*b* is released from the cover body 44*a*) for some reason, it is possible to prevent the shield plate 44*b* from falling onto the floor F.

The embodiment of the invention has been described above, but the invention is not limited to the external appearance and configuration thereof. Various modifications, additions, and deletions may be made to the embodiment without changing the scope of the invention. For example, the following modifications may be made.

In the aforementioned embodiment of the invention, the attachment bracket 42, the magnetic detector 41, and the cover 44 are fixed to the upper rail 12, and the detected body 43 is fixed to the lower rail 11. However, the invention is not limited to this configuration, and the opposite configuration may be employed. In this case, even when there are magnetic foreign substances, such as iron pieces, on the floor F, these foreign substances are unlikely to adhere to the magnetic force detection portion 41*a*, because the lower face of the magnetic force detection portion 41*a* in the aforementioned embodiment of the invention is directed upward. However, even if there occurs a situation in which there are magnetic foreign substances, such as iron pieces, in the vicinity of the cover 44 for some reason, it is possible to obtain the effect of reducing the possibility that these foreign substances may adhere to the magnetic force detection portion 41*a*.

In the aforementioned embodiment of the invention, the shield plate 44*b* is placed on and attached to the detection portion cover portion 44*a*3 of the cover body 44*a* made of resin, but the invention is not limited to this configuration. The detection portion cover portion 44*a*3 may be eliminated, and the shield plate 44*b* may be attached to the lower end portion of the lateral cover portion 44*a*2. Furthermore, a region of the lateral cover portion 44*a*2, which extends from a part of the lateral cover portion 44*a*2 to the detection portion cover portion 44*a*3, may be replaced with a shield plate, and the shield plate may be attached to the remaining region of the lateral cover portion 44*a*2. It should be noted, however, that the shield plate is required to be undetectable by the magnetic detector 41 in this case.

What is claimed is:

1. A cover structure in a slide position detection device for a vehicle seat, the cover structure comprising:
    a magnetic detector that is disposed on a side of one of a fixed rail and a movable rail that constitute a slide mechanism for the vehicle seat;
    a cover that covers the magnetic detector and that is disposed on the side of the one of the fixed rail and the movable rail; and
    a detected portion that is disposed on a side of the other of the fixed rail and the movable rail, wherein:
    the cover includes a lateral cover portion that covers a lateral portion of the magnetic detector, and a detection portion cover portion that faces a detection portion of the magnetic detector and that covers the detection portion; and
    the detection portion cover portion is provided with a ferromagnetic plate that faces the detection portion, the ferromagnetic plate being located at a position that is farther from the detection portion than a closest position of the detected portion relative to the detection portion, and the ferromagnetic plate shielding against magnetism from the magnetic detector.

2. The cover structure according to claim 1, wherein the lateral cover portion and the detection portion cover portion are integrally formed.

3. The cover structure according to claim 2, wherein:
    the one of the fixed rail and the movable rail is the movable rail;
    the other of the fixed rail and the movable rail is the fixed rail, and is attached to a floor;
    the cover is formed of resin; and
    the ferromagnetic plate is provided on a side of a face of the detection portion cover portion, the face facing toward the magnetic detector.

4. The cover structure according to claim 1, wherein a standing wall portion that extends toward the magnetic detector is provided at an end portion of the ferromagnetic plate, the end portion being on a side of the slide mechanism.

5. A cover structure in a slide position detection device for a vehicle seat, the cover structure comprising:
    a magnetic detector that is disposed on a side of one of a fixed rail and a movable rail that constitute a slide mechanism for the vehicle seat;
    a cover that covers the magnetic detector and that is disposed on a side of the one of the fixed rail and the movable rail; and
    a detected portion that is disposed on a side of the other of the fixed rail and the movable rail, wherein the cover includes a lateral cover portion that covers a lateral portion of the magnetic detector, and a ferromagnetic plate that is attached to the lateral cover portion, and that faces toward a detection portion of the magnetic detector, the ferromagnetic plate being located at a position that is farther from the detection portion than a closest position of the detected portion relative to the detection portion, and the ferromagnetic plate shielding against magnetism from the magnetic detector.

6. The cover structure according to claim 1, wherein the magnetic detector, the ferromagnetic plate, and the detected portion are disposed such that the closest position of the detected portion relative to the detection portion is positioned between the detection portion and the ferromagnetic plate.

7. The cover structure according to claim 5, wherein the magnetic detector, the ferromagnetic plate, and the detected portion are disposed such that the closest position of the detected portion relative to the detection portion is positioned between the detection portion and the ferromagnetic plate.

* * * * *